(12) United States Patent
Le Bras et al.

(10) Patent No.: US 12,228,899 B2
(45) Date of Patent: Feb. 18, 2025

(54) MULTIPLE ENERGY SOURCE MANAGEMENT SYSTEM FOR AN INTEGRATED HYDROGEN-ELECTRIC ENGINE

(71) Applicant: ZeroAvia, Ltd., Cirencester (GB)

(72) Inventors: Kevin Le Bras, Santa Cruz, CA (US); Ritish Tejpal, Santa Cruz, CA (US)

(73) Assignee: ZeroAvia, Ltd., Cirencester (GB)

( * ) Notice: Subject to any disclaimer, the term of this patent is extended or adjusted under 35 U.S.C. 154(b) by 308 days.

(21) Appl. No.: 17/657,357

(22) Filed: Mar. 30, 2022

(65) Prior Publication Data

US 2022/0326671 A1 Oct. 13, 2022

Related U.S. Application Data

(60) Provisional application No. 63/169,525, filed on Apr. 1, 2021, provisional application No. 63/168,593, filed on Mar. 31, 2021.

(51) Int. Cl.

| | |
|---|---|
| *G05B 19/042* | (2006.01) |
| *B64C 19/00* | (2006.01) |
| *B64D 27/24* | (2024.01) |
| *B64D 45/00* | (2006.01) |
| *H02J 7/00* | (2006.01) |

(52) U.S. Cl.
CPC ............ *G05B 19/042* (2013.01); *B64C 19/00* (2013.01); *B64D 45/00* (2013.01); *H02J 7/0063* (2013.01); *B64D 27/24* (2013.01); *G05B 2219/2639* (2013.01); *H02J 2207/20* (2020.01); *H02J 2300/30* (2020.01)

(58) Field of Classification Search
CPC .......... G05B 19/042; G05B 2219/2639; B64C 19/00; B64D 45/00; B64D 27/24; H02J 7/0063; H02J 2207/20; H20J 2300/30
See application file for complete search history.

(56) References Cited

U.S. PATENT DOCUMENTS

2018/0086476 A1* 3/2018 Filangi .................... H02J 3/381
2021/0151783 A1 5/2021 Miftakhov

* cited by examiner

*Primary Examiner* — Carlos Amaya
(74) *Attorney, Agent, or Firm* — Osha Bergman Watanabe & Burton LLP

(57) ABSTRACT

A multiple energy source management system for an integrated hydrogen-electric engine is disclosed, the system includes a first and a second energy source providing energy to the integrated hydrogen-electric engine. A pre-charge load to provide an energy demand to a selected energy source. A sensor monitoring a power output from the first and/or second energy source. A relay to switch between the first and second energy sources. A computer system to receive an output energy of the first energy source, determine if the output energy is below a threshold value, switch the relay from the first state to the third state for a predetermined period of time, based on the determination, pre-charge the second energy source by the pre-charge load; and switch the relay to the second state after the predetermined period of time.

16 Claims, 12 Drawing Sheets

MULTIPLE ENERGY SOURCE MANAGEMENT SYSTEM FOR AN INTEGRATED HYDROGEN-ELECTRIC ENGINE

CROSS-REFERENCE TO RELATED APPLICATIONS (PROVISIONAL)

This application claims priority to and benefit of U.S. Provisional Patent Application No. 63/169,525 filed on Apr. 1, 2021, entitled "MULTIPLE ENERGY SOURCE MANAGEMENT SYSTEM FOR AN INTEGRATED HYDROGEN-ELECTRIC ENGINE" by Le Bras et al., and assigned to the assignee of the present application, the disclosure of which is hereby incorporated by reference in its entirety.

This application claims priority to and benefit of U.S. Provisional Patent Application No. 63/168,593 filed on Mar. 31, 2021, entitled "CONTROLLER AREA NETWORK BUS WIRELESS RELAY FOR REAL-TIME AND POST-FLIGHT DIAGNOSTICS" by Le Bras and assigned to the assignee of the present application, the disclosure of which is hereby incorporated by reference in its entirety.

FIELD OF THE INVENTION

Embodiments of the present technology relate generally to clean energy-based air propulsion systems, and more particularly, to multiple power source management for integrated hydrogen-electric systems such as for aircraft transportation systems.

BACKGROUND

Most issued pilot licenses are in the private pilot category. Moreover, the aircraft most often used in private aviation is the small single engine aircraft. These aircraft usually employ a single piston gasoline engine as the primary method of forward propulsion. Coincidentally, these small single engine aircraft contribute the highest number of safety infractions and accidents in general aviation. In case of failure of the single engine, the aircraft encounters a seriously hazardous condition and has to land immediately. If such event occurs over mountains terrain, at night, or in the Instrumental Meteorological Conditions (IMC), the outcome is often tragic.

Moreover, a traditional internal combustion aviation engine contains a large number of moving parts with a low level of integration and which operate under large mechanical and thermal stresses. This unnecessarily adds weight and volume to the aircraft, negatively affects reliability of components, significantly limits useful life of the engines, increases environmental pollution, and increases probability of failure per hour of operation. As a result, aircraft owners and operators incur frequent and extensive maintenance of their engines which adds a significant cost to the ownership and operation of traditionally-powered aircraft.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Hydrogen-electric engine systems are disclosed herein as an example use of the system for fuel cell management. However, it should be appreciated that in another embodiment, other systems with different types of fuel cells are used in conjunction with or in place of one or more of the Hydrogen and/or electric engine systems.

Figure 1:
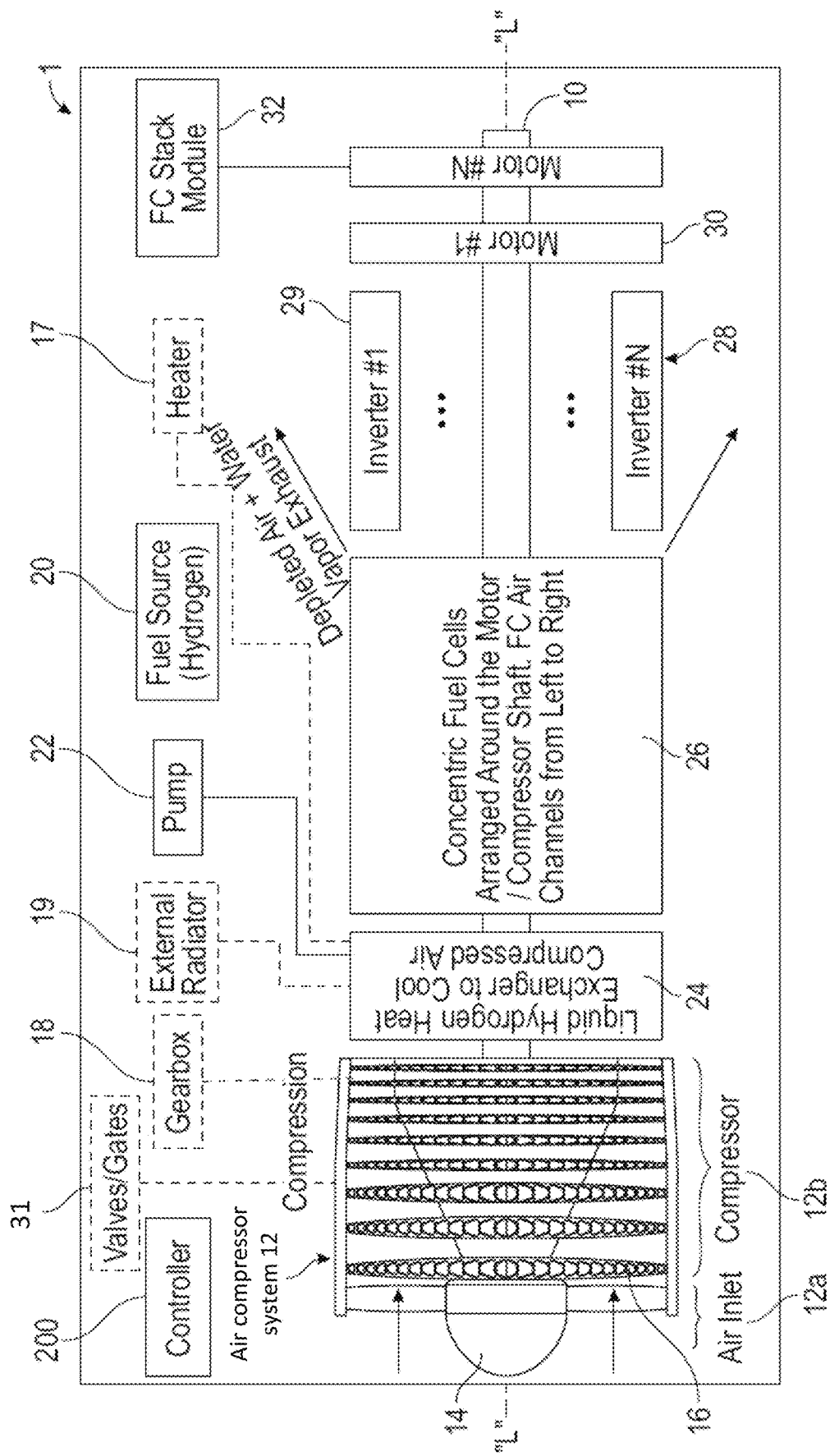
FIG. 1 is a schematic view of an integrated hydrogen-electric engine system, in accordance with an embodiment.

With reference now to FIG. 1, a block diagram of an integrated hydrogen-electric engine system 1 is shown in accordance with one embodiment. In one embodiment, integrated hydrogen-electric engine system 1 is utilized, for example, in a turboprop or turbofan system, to provide a streamlined, lightweight, power-dense, and efficient system. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 26 in fluid communication with heat exchanger 24, and a motor assembly disposed in electrical communication with the fuel cell stack 26.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of airflow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 26 for conversion to electrical energy.

In one embodiment, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 31 to regulate the pressure and flow of the air that enters the downstream fuel cell stack 26, as well as to manage the cold air supply to any auxiliary heat exchangers in the system.

Compressor system 12 can optionally be mechanically coupled to elongated shaft 10 via a gearbox 18 to change (increase and/or decrease) compressor turbine rotations per minute (RPM) and to change the airflow to fuel cell stack 26. For instance, gearbox 18 can be configured to enable the airflow, or portions thereof, to be exhausted for controlling a rate of airflow through the fuel cell stack 26, and thus, the output power.

Integrated hydrogen-electric engine system 1 further includes a gas management system such as a heat exchanger 24 disposed concentrically about elongated shaft 10 and configured to control thermal and/or humidity characteristics of the compressed air from air compressor system 12 for conditioning the compressed air before entering fuel cell stack 26. Integrated hydrogen-electric engine system 1 further also includes a fuel source 20 of fuel cryogenic (e.g., liquid hydrogen (LH2), or cold hydrogen gas) that is operatively coupled to heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system.

In one embodiment, the hydrogen gas is heated in the heat exchanger 24 to a working temperature of the fuel cell stack 26, which also takes heat out of the compressed air, which results in control of flow through the heat exchanger 24. In one embodiment, a heater 17 can be coupled to or included with heat exchanger 24 to increase the heat as necessary, for instance, when running under a low power regime. Additionally, and/or alternatively, motor assembly can be coupled to heat exchanger 24 for looping in the cooling/heating loops from motor assembly as necessary. Such heating/cooling control can be managed, for instance, via controller 200 of integrated hydrogen-electric engine system 1. In one embodiment, fuel source 20 can be disposed in fluid communication with motor assembly or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen.

Figure 2:
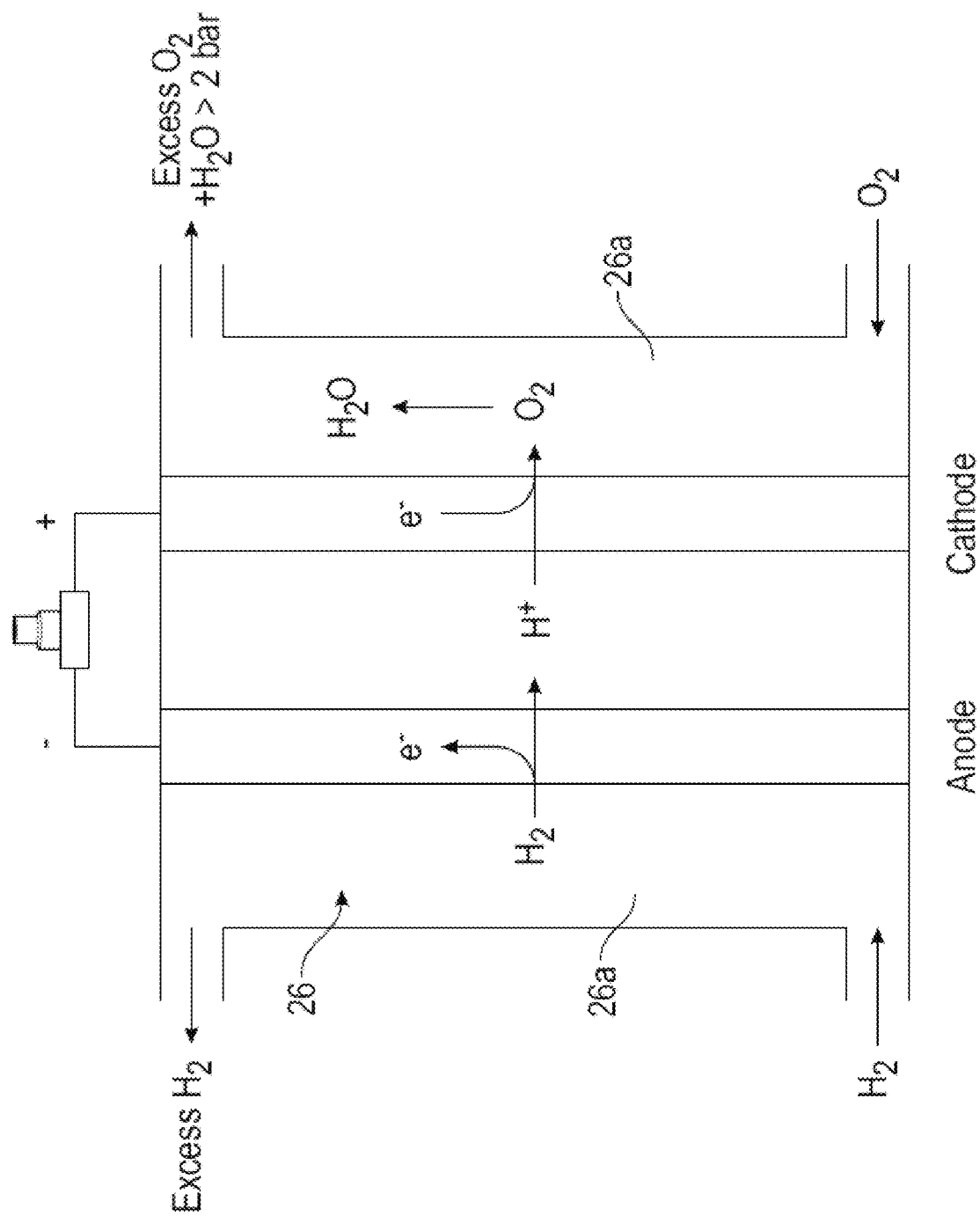
FIG. 2 is a schematic view of a fuel cell of the integrated hydrogen-electric engine system of FIG. 1, in accordance with an embodiment.

With reference also to FIG. 2, In one embodiment, integrated hydrogen-electric engine system 1 further includes an energy core in the form of a fuel cell stack 26, which is circular, and is also coaxially supported on elongated shaft 10 (e.g., concentric) such that any air channels of fuel cell stack 26 is oriented in parallel relation with elongated shaft 10 (e.g., horizontally or left-to-right). In one embodiment, fuel cell stack 26 is in the form of a proton-exchange membrane fuel cell (PEMFC). The fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26. The electrical energy generated from fuel cell stack 26 is then transmitted to the motor assembly, which is also coaxially/concentrically supported on elongated shaft 10.

In one embodiment, integrated hydrogen-electric engine system 1 includes any number of external radiators 19 for facilitating airflow and adding, for instance, additional cooling. Notably, fuel cell stack 26 can include liquid-cooled and/or air-cooled cell types so that cooling loads are integrated into heat exchanger 24 for reducing the total amount of external radiators needed in the system.

The motor assembly of integrated hydrogen-electric engine system 1 includes a plurality of inverters 28 and 29 configured to convert the direct current to alternating current for actuating one or more of a plurality of motors 30 in electrical communication with the inverters 28 and 29. The plurality of motors 30 are configured to drive (e.g., rotate) the elongated shaft 10 in response to the electrical energy received from fuel cell stack 26 for operating the components on the elongated shaft 10 as elongated shaft 10 rotates.

In one embodiment, one or more of the inverters 28 and 29 is disposed between motors 30 (e.g., a pair of motors) to form a motor subassembly, although any suitable arrangement of motors 30 and inverters 28 and 29 is provided. The motor assembly can include any number of motor subassemblies supported on elongated shaft 10 for redundancy and/or safety. In one embodiment, the motor assembly can include any number of fuel cell stack modules 32 configured to match the power of the motors 30 and the inverters 28 and 29 of the subassemblies. In this regard, for example, during service, the fuel cell stack modules 32 can be swapped in/out. Each fuel cell stack modules 32 can provide any power, such as 400 kw or any other suitable amount of power, such that when stacked together (e.g., 4 or 5 modules), total power can be about 2 Megawatts on the elongated shaft 10. In embodiments, motors 30 and inverters 28 and 29 can be coupled together and positioned to share the same thermal interface so a motor casing of the motors 30 is also an inverter heat sink so only a single cooling loop goes through the motor assembly for cooling the inverters 29 and the motors 30 at the same time. This reduces the number of cooling loops and therefore the complexity of the system.

Integrated hydrogen-electric engine system 1 further includes a controller 200 (e.g., a full authority digital engine (or electronics) control (e.g., a FADEC) for controlling the various embodiments of the integrated hydrogen-electric engine system 1 and/or other components of the aircraft system. For instance, controller 200 can be configured to manage a flow of liquid hydrogen, manage coolant liquids from the motor assembly, manage, for example, any dependent auxiliary heater for the liquid hydrogen, manage rates of hydrogen going into fuel cell stack 26, manage rates of heated/cooled compressed air, and/or various flows and/or power of integrated hydrogen-electric engine system 1.

In one embodiment, managing these thermal management components is designed to ensure the most efficient use of the various cooling and heating capacities of the respective gases and liquids to maximize the efficiency of the system and minimize the volume and weight of the same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
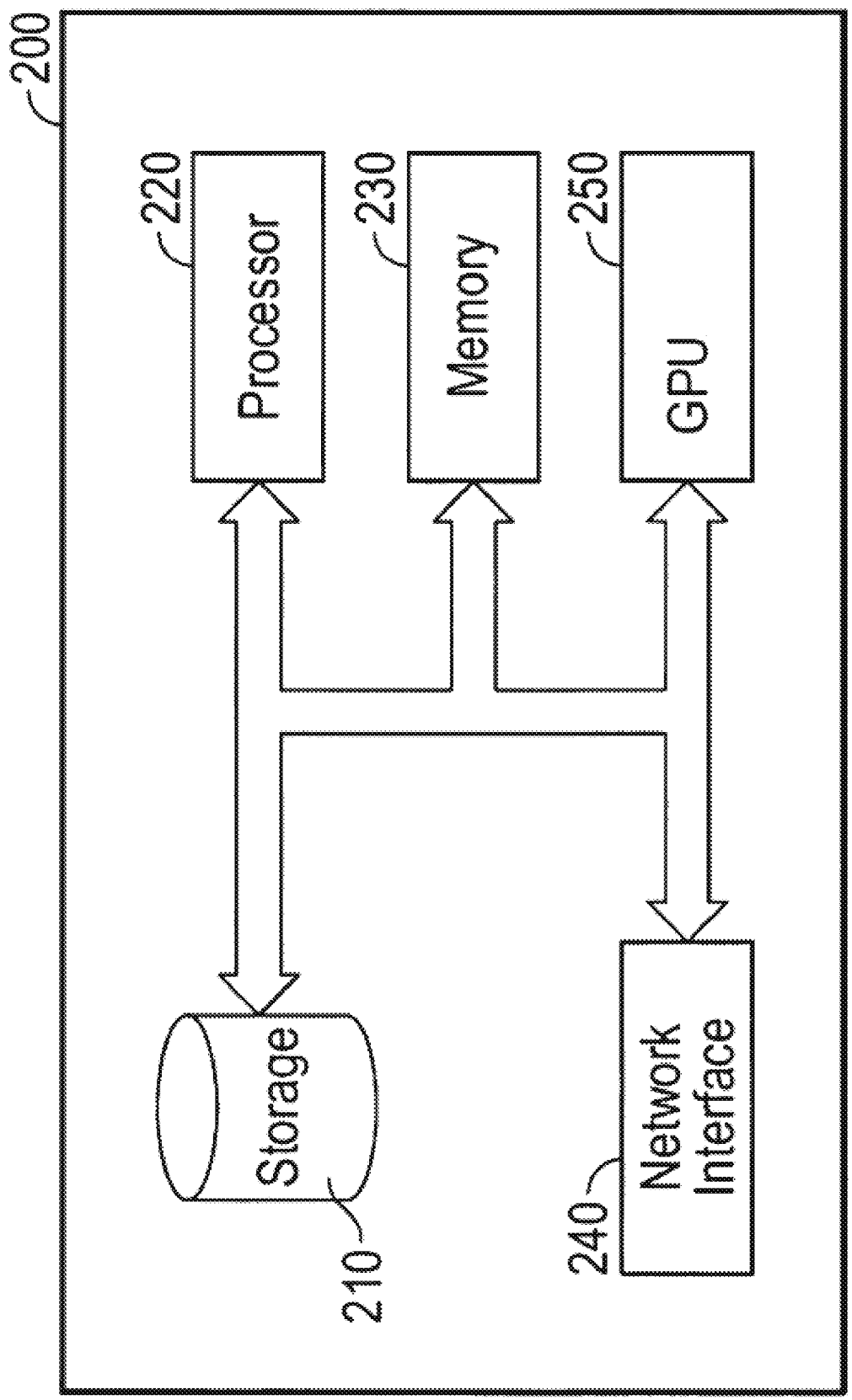
FIG. 3 is a block diagram of a controller configured for use with the integrated hydrogen-electric engine system of FIG. 1, in accordance with an embodiment.

FIG. 3 illustrates a controller 200 in accordance with an embodiment. In one embodiment controller 200 includes a processor 220 coupled with a computer-readable storage medium or a memory 230. The computer-readable storage medium or memory 230 is a volatile type of memory, e.g., RAM, or a non-volatile type memory, e.g., flash media, disk media, etc. In one embodiment, the processor 220 is another type of processor such as, without limitation, a digital signal processor, a microprocessor, an ASIC, a graphics processing unit (GPU), a field-programmable gate array (FPGA), or a central processing unit (CPU). In one embodiment, network inference is accomplished in systems that have weights implemented as memristors, chemically, or other inference calculations, as opposed to processors.

In one embodiment, the memory 230 can be random access memory, read-only memory, magnetic disk memory, solid-state memory, optical disc memory, and/or another type of memory. In one embodiment, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In one embodiment, the controller 200 includes a network interface 240 to communicate with other computers or to a server. A storage device 210 is used for storing data.

In one embodiment, the disclosed method runs on the controller 200 or on a user device, including, for example, on a mobile device, an IoT device, or a server system.

In one embodiment, controller 200 is configured to receive, among other data, the fuel supply status, aircraft location, and control, among other features, the pumps, motors, sensors, etc.

In one embodiment, or in different embodiments, the integrated hydrogen-electric engine system 1 can include any number and/or type of sensors, electrical components, and/or telemetry devices that are operatively coupled to controller 200 for facilitating the control, operation, and/or input/out of the various components of integrated hydrogen-electric engine system 1 for improving efficiencies and/or determining errors and/or failures of the various components.

For a more detailed description of components of similar hydrogen-electric engine systems, one or more components of which can used or modified for use with the structure of the present disclosure, reference can be made, for example, to U.S. patent application Ser. No. 16/950,735.

Figure 4:
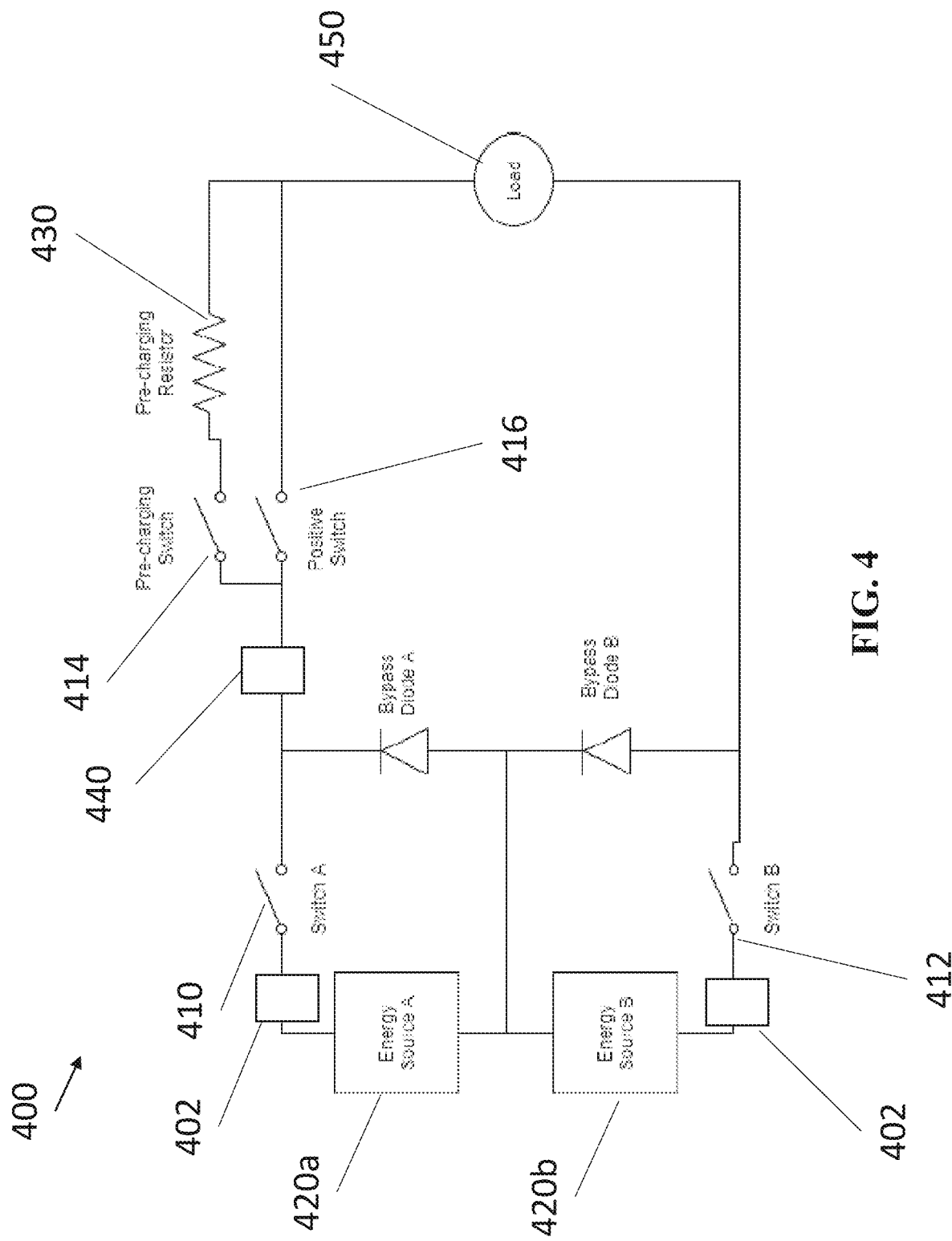
FIG. 4 is a block diagram of an energy source management system of the integrated hydrogen-electric engine system of FIG. 1, in accordance with an embodiment.

Referring to FIG. 4, a system 400 for managing multiple power sources is shown in accordance with an embodiment. In one embodiment, system 400 generally includes a plurality of energy sources 420a, 420a configured to fuel a load 450 such as the integrated hydrogen-electric engine 1 of FIG. 1, a first switch 410 and a second switch 412 to selectively switch between each of the plurality of energy sources 420a 420b, a pre-charge load 430, a third switch 416 and a pre-charging switch 414 to selectively switch in or out the pre-charge load 430 and a sensor 440 to sense a power level, a voltage, and/or a current of the load 450 and/or pre-charge load 430. In one embodiment, the system further includes a smoothing capacitor 402 on each of the energy sources 420, configured to smooth the power supplied by each of the plurality of energy sources 420.

In one embodiment, each of the plurality of energy sources 420a, 420b, includes a fuel cell 26, a battery, or combinations thereof. For example, a first energy source 420a includes a first fuel cell 26 and a second energy source 420b includes a battery (charged by the first fuel cell 26 or another fuel cell 26). The system 1 of FIG. 1 includes a parallel and/or a series arrangement of energy sources 420.

In one embodiment, the pre-charge load 430 is configured to provide a very low load (e.g., 10A) to the plurality of energy sources 420. For example, the pre-charge load 430 enables the pre-charging of capacitive sources (e.g., energy sources with smoothing capacitors 402) at a low load (e.g., 10A) so that a spike from in-rush current caused by switching the relay does not weld the relay's 410 contacts during switching under high load conditions. A high load condition includes the load that the motor 30 (or motor assembly) would provide.

The first switch 410 (e.g., a relay) and the second switch 412 (e.g., a relay) are configured to selectively switch between various combinations of energy sources 420a 420b. For example, selectively switch between a first energy source 420a and a second energy source 420b. In the description hereof, both the terms "relay" and "switch" can be used for switching devices configured to switch on and off the connections. These terms are, however, not used to distinguish between different types of switching devices (for example, an electromagnetic relay and a semiconductor switch) but are simply used for the purpose of convenience.

In one embodiment, the first switch 410, the second switch 412, the third switch 416, and the pre-charge switch 414 have various states for selectively connecting an energy source 420a to either the load 450 (such as a motor 30 of FIG. 1) or the pre-charge load 430. For example, a first state could be where the first energy source 420a is selected to supply energy to the motor 30 (FIG. 1); a second state could be where the second energy source 420b is selected to supply energy to the motor 30; and a third state could be where the second energy source 420b is supplying energy to the pre-charge load 430. The first switch 410, the second switch 412, the third switch 416, and the pre-charge switch 414 are implemented as discrete switches (e.g., mechanical switches, electromechanical switches, and/or semiconductor switches), and/or as a relay.

For example, to switch from a state where the first energy source 420a plus the second energy source 420b supplying energy to the load 450 (e.g., first switch 410, the second switch 412, the third switch 416, are closed, the pre-charge switch 414 is open), to a state where only the first energy source 420a supplying energy to the load 450, the energy demand from the load 450 would first be reduced (the third switch 416 would open). Next, the pre-charge switch 414 would switch to a closed state to engage the pre-charge load 430. The sensor 440 would measure the current and the system 1 would determine of the current has dropped below a predetermined value (e.g., a safe threshold). Next the second switch 412 would open, disconnecting the second energy source 420b. Finally, the third switch 416 would close, the pre-charge switch 414 would open, and power demand would return to pre-switching power levels.

In another example, to switch from a state where the first energy source 420a plus the second energy source 420b supplying energy to the load 450 (e.g., first switch 410, the second switch 412, the third switch 416, are closed, the pre-charge switch 414 is open), to a state where only the second energy source 420b supplying energy to the load 450, the energy demand from the load 450 would first be reduced (the third switch 416 would open). Next, the pre-charge switch 414 would switch to a closed state to engage the pre-charge load 430. The sensor 440 would measure the current and the system 1 would determine of the current has dropped below a predetermined value (e.g., a safe threshold). Then, the first switch 410 would open, disconnecting the first energy source 420a. Finally, the third switch 416 would close, the pre-charge switch 414 would open, and power demand would return to pre-switching power levels.

In another example, to switch from a state where only the first energy source 420a supplying energy to the load 450 (e.g., first switch 410 and the third switch 416 are closed, the second switch 412 and the pre-charge switch 414 are open) to a state where the first energy source 420a plus the second energy source 420b supplying energy to the load 450, the energy demand from the load 450 would first be reduced (the third switch 416 would open). Next, the pre-charge switch 414 would switch to a closed state to engage the pre-charge load 430 and the third switch 416 would switch to an open state. The sensor 440 would measure the current and the system 1 would determine of the current has dropped below a predetermined value (e.g., a safe threshold). Next the second switch 412 would close, engaging the second energy source 420b. Finally, the third switch 416 would close, the pre-charge switch 414 would open, and power demand would return to pre-switching power levels.

In another example, to switch from a state where only the second energy source 420b supplying energy to the load 450 (e.g., second switch 412 and the third switch 416 are closed, the first switch 410 and the pre-charge switch 414 are open) to a state where the first energy source 420a plus the second energy source 420b supplying energy to the load 450, the energy demand from the load 450 would first be reduced (the third switch 416 would open). Next, the pre-charge switch 414 would switch to a closed state to engage the pre-charge load 430 and the third switch 416 would switch to an open state. The sensor 440 would measure the current and the system 1 would determine of the current has dropped below a predetermined value (e.g., a safe threshold). Next the first switch 410 would close, engaging the first energy source 420a. Finally, the third switch 416 would close, the pre-charge switch 414 would open, and power demand would return to pre-switching power levels.

A benefit of this configuration is that it allows the switching of energy sources while the system is actively running. While two power sources are shown in one embodiment, in another embodiment, the system can be used with any number of power sources.

Figure 5:
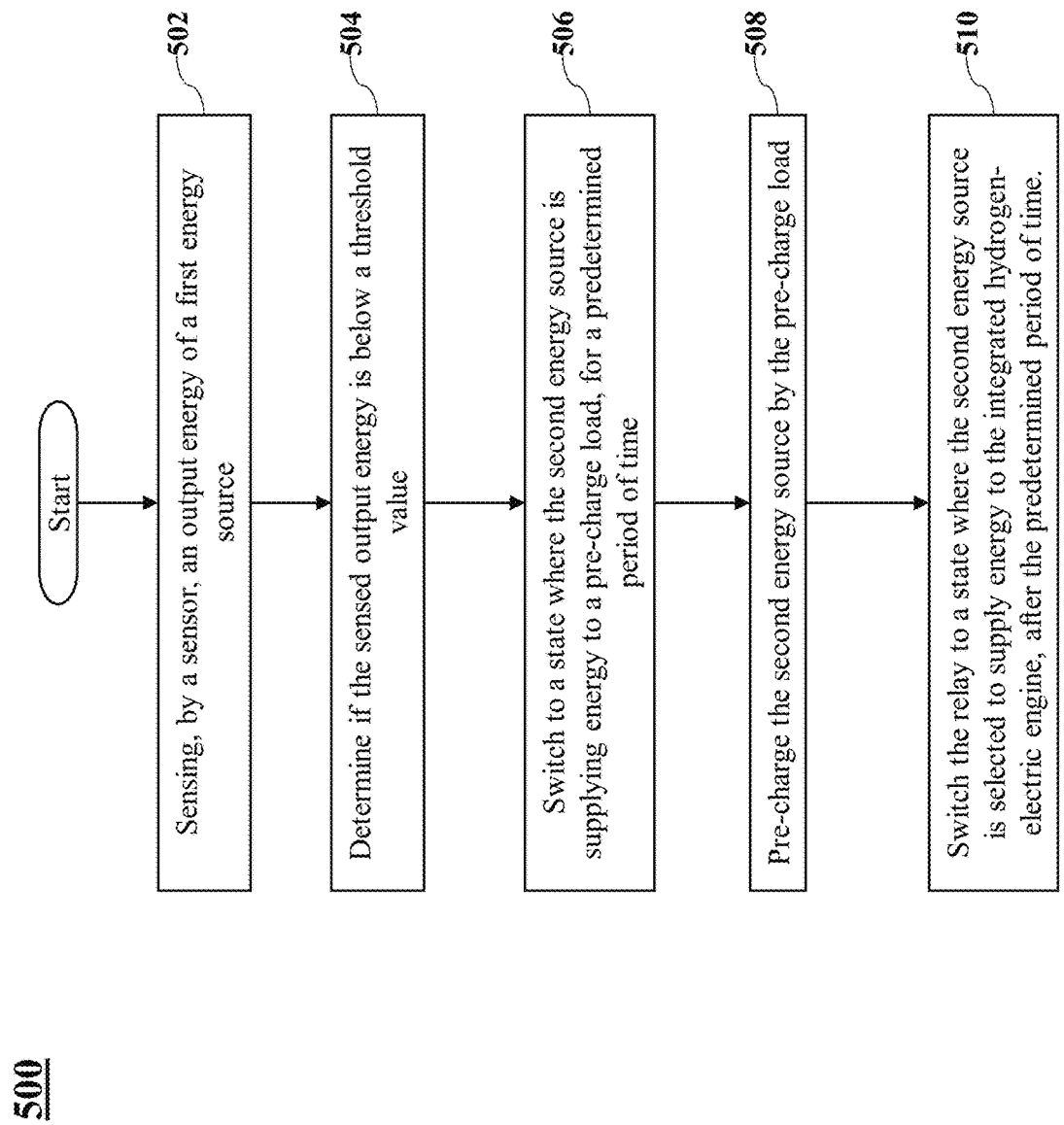
FIG. 5 is a flow diagram of a method for predictive fuel cell management of the integrated hydrogen-electric engine system of FIG. 1, in accordance with an embodiment.

Referring now to FIG. 5, a flow chart of an exemplary computer-implemented method 500 for multiple energy source management of an integrated hydrogen-electric engine is shown in accordance with an embodiment. Although the components of FIG. 5 are shown in a particular order, in one embodiment, they need not all be performed in the specified order, certain pieces can be performed in another order, and other actions are added or removed. For purposes of clarity, FIG. 5 will be described below, with the controller 200 performing the operations. However, in various embodiments, the operations of FIG. 5 are performed in part by the controller 200 of FIG. 3 and in part by another device, such as a remote server, or the like.

At 502, the controller 200 senses, by a sensor 440, an output energy of a first energy source 420a (e.g., a battery). The first energy source 420a is electrically connected to the motor 30 (and/or motor assembly) via a relay 410. In one embodiment, the system 400 includes an inverter 29 configured to convert the direct current from the energy sources 420 to alternating current for actuating the motor 30 in electrical communication with the inverter 29. The sensor 440 senses a power output from the first energy source 420a and/or the second energy source 420b. In one embodiment, the sensor 440 includes, for example, a power sensor, a voltage sensor, a current sensor, and/or the like.

In one embodiment, the energy source(s) 420a, 420b, is a fuel cell, a battery, a fuel cell stack, and/or a combinations thereof. In one embodiment, the system includes multiple energy source(s) 420a, 420b, in series, parallel, and/or in combination. In one embodiment, the controller 200 activates the fuel cells of a fuel cell stack by turning the individual fuel cells on or off at different intervals, timing, etc. In one embodiment, the operation varies pump pressures (hydrogen and/or oxygen) (e.g., pump 22 of FIG. 1), motor speeds (e.g., motor assembly which is coupled with a heat exchanger 24 of FIG. 1), fan speeds (e.g., propulsor 14 of FIG. 1), and/or turn on/off auxiliary batteries, to generate energy. For example, in a case where less energy is required, the operation increases the motor speed of motor assembly, which is coupled with a heat exchanger 24, to increase the heat, as necessary. In another example, the operation will increase or decrease the pressure from pump 22 (FIG. 1), which is in fluid communication with a fuel source 20 (e.g., hydrogen) to pump the fuel to heat exchanger 24 for conditioning compressed air. In one embodiment, the fuel, while in the heat exchanger 24, becomes gasified because of heating. That is, in one embodiment, the hydrogen gas gets heated in the heat exchanger 24 to a working temperature of the fuel cell 26, which also takes heat out of the compressed air, which results in control of flow through the heat exchanger 24 regulating the generated amount of energy accordingly.

In one embodiment, at 504, the controller 200 determines if the sensed output energy is below a threshold value. In one embodiment, the predetermined threshold value can change based on the energy demand of the integrated hydrogen-electric engine. For example, in one embodiment the threshold will be a higher value of the integrated hydrogen-electric engine demands more power (e.g., during an increase in altitude).

In one embodiment, at 506, the controller 200 switches from a first state to a third state where the second energy source 420b (e.g., a second battery) is supplying energy to a pre-charge load, for a predetermined period of time, based on the determination. In one embodiment, the predetermined period of time is, for example, about 100 milli-seconds. For example, the first energy source 420a, includes a first battery. The controller switches the relay 410 such that the first battery is no longer supplying energy to the integrated hydrogen-electric engine, i.e., the battery is "disarmed."

In one embodiment, the relay includes four states. For example, the first state where the first energy source is selected to supply energy to the integrated hydrogen-electric engine. A second state where the second energy source 420b is selected to supply energy to the integrated hydrogen-electric engine. A third state where the second energy source 420b is supplying energy to the pre-charge load 430. A fourth state where the first energy source is supplying energy to the pre-charge load 430. Although four states are used as an example, In another embodiment, any number of suitable states are used.

Figure 6:
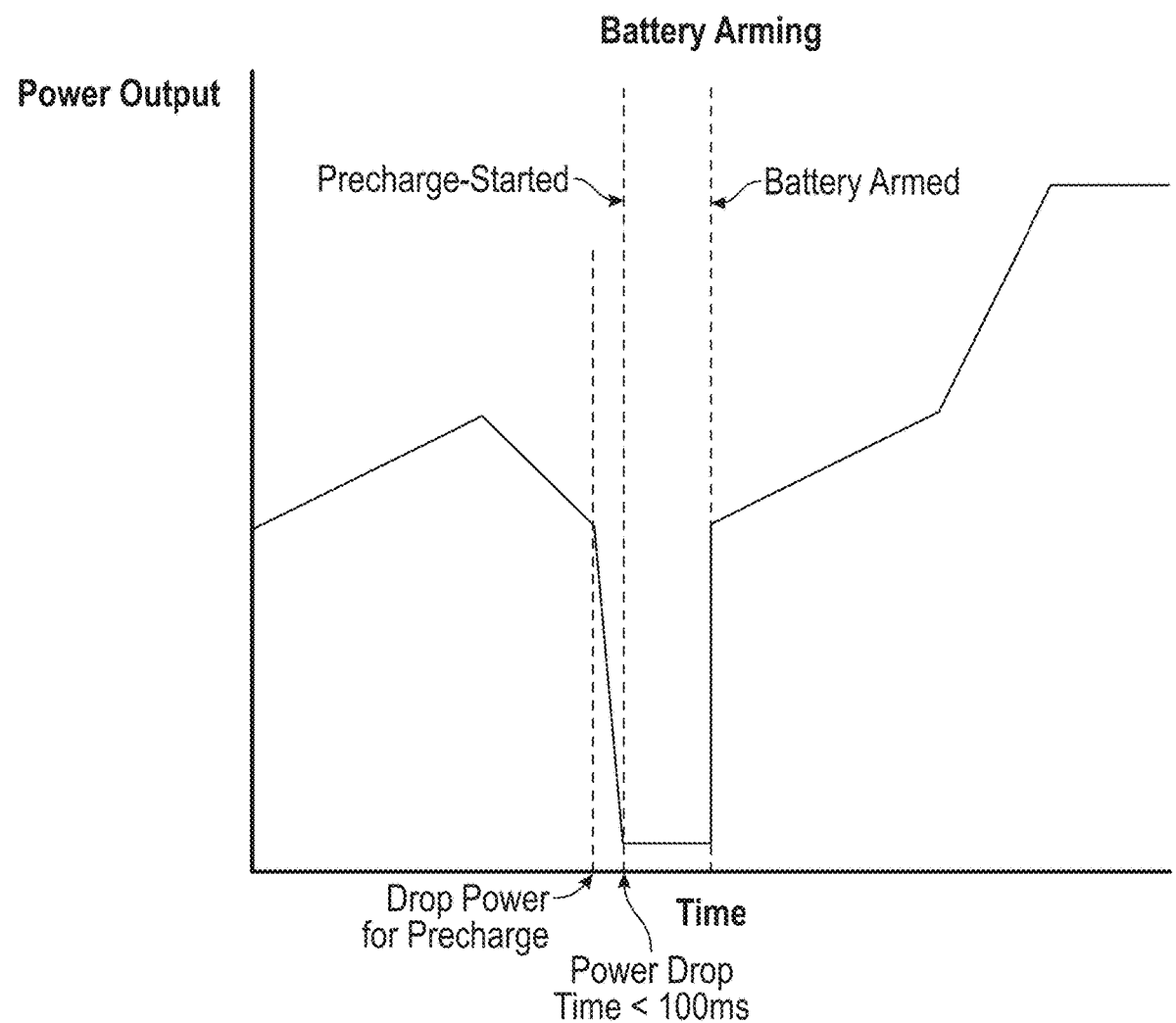
FIG. 6 is a graph of power output over time for fuel cell and battery arming and disarming of the integrated hydrogen-electric engine system of FIG. 1, in accordance with an embodiment.

At 508, the controller 200 pre-charges the second energy source 420b by the pre-charge load 430. For example, the second energy source 420b includes a second battery. The controller would pre-charge the second battery by connecting about a 10-ampere load for about 100 milli seconds (FIG. 6).

At 510, the controller 200 switches the relay to the second state where the second energy source is selected to supply energy to the integrated hydrogen-electric engine, after the predetermined period of time.

In one embodiment, the controller charges the first energy source 420a while the first energy source 420a is not providing energy to the integrated hydrogen-electric engine.

In one embodiment, the controller 200 displays, on a display, a status indicating the relay's 410 status. For example, the display displays an indication that the first energy source is supplying energy to the integrated hydrogen-electric engine and the second energy source is being charged.

In one embodiment, the controller 200 receives from the sensor 440, the output energy of the second energy source 420b. The controller determines if the sensed output energy is below a threshold value. In one embodiment, the controller switches the relay 410 from a second state to the fourth state. In one embodiment, the controller pre-charges the first energy source by the pre-charge load. In one embodiment, the controller switches the relay 410 to the first state after the predetermined period of time.

Referring to FIGS. 6-9, graphs of power output over time for fuel cell 26 and battery arming and disarming, are shown in accordance with an embodiment. In one embodiment, the arming and/or disarming of a battery and/or a fuel cell/fuel cell stack is performed by selective switching of the relay 410 (FIG. 4). FIG. 6 shows an example graph of power output over time during the arming sequence of a battery. For example, the controller would drop power demand on the battery to allow for pre-charging to begin. The controller would detect the power level is below a predetermined threshold as shown at 504 (FIG. 5) and switch the relay 410 (FIG. 4) so that the battery is connected to the pre-charge load as shown at 506 (FIG. 5). The controller would pre-charge the battery for a predetermined period of time (e.g., 100 ms) as shown at 508. The controller would then "arm" the battery by switching the relay 410 to electrically connect the battery to supply energy to the integrated hydrogen-electric engine.

Figure 7:
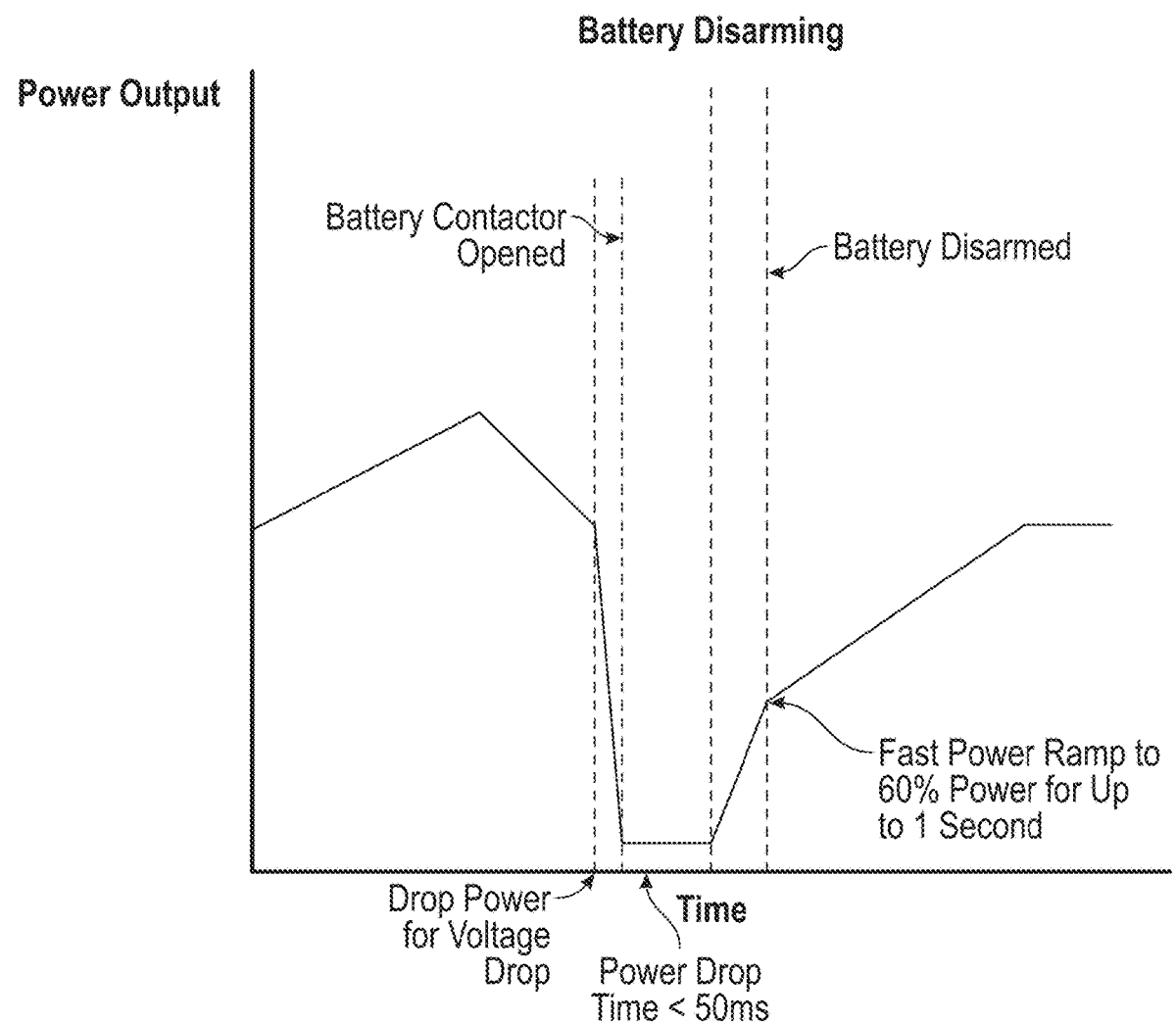
FIG. 7 is another graph of power output over time for fuel cell and battery arming and disarming of the integrated hydrogen-electric engine system of FIG. 1, in accordance with an embodiment.

FIG. 7 shows an example graph of power output over time during the disarming sequence of a battery in accordance with an embodiment. For example, when the relay 410 (FIG. 4) is switched so that the battery is not supplying energy to the integrated hydrogen-electric engine.

Figure 8:
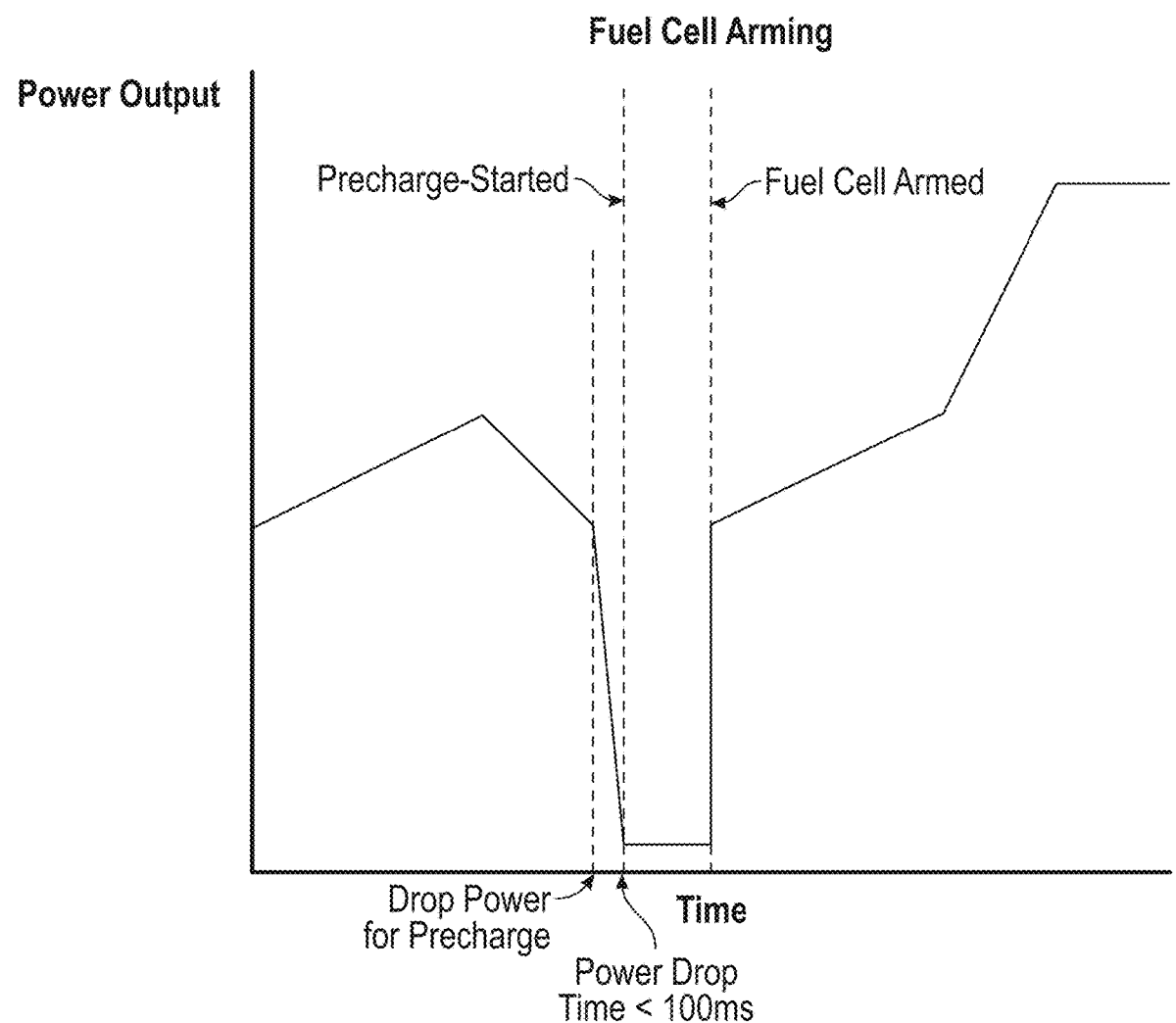
FIG. 8 is another graph of power output over time for fuel cell and battery arming and disarming of the integrated hydrogen-electric engine system of FIG. 1, in accordance with an embodiment.

FIG. 8 shows an example graph of power output over time during the arming sequence of a fuel cell 26 in accordance with an embodiment. For example, the controller would drop power demand on the fuel cell 26 to allow for pre-charging to begin. The controller would detect the power level is below a predetermined threshold as shown at 504 (FIG. 5) and switch the relay 410 (FIG. 4) so that the fuel cell 26 is connected to the pre-charge load as shown at 506 (FIG. 5). The controller 200 would pre-charge the fuel cell 26 for a predetermined period of time (e.g., 100 ms) as shown at 508. The controller would then "arm" the fuel cell 26 by switching the relay 410 to electrically connect the battery to supply energy to the integrated hydrogen-electric engine.

Figure 9:
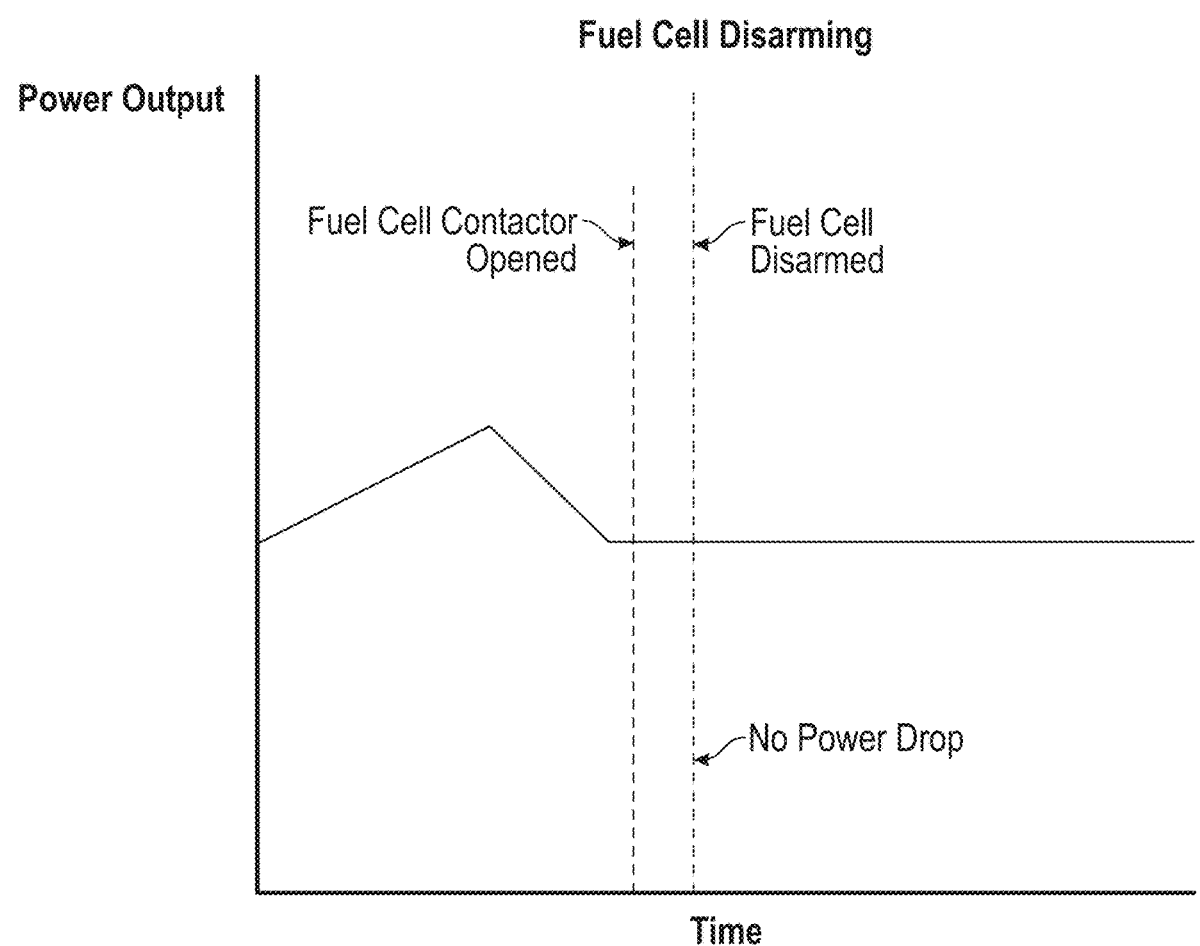
FIG. 9 is another graph of power output over time for fuel cell and battery arming and disarming of the integrated hydrogen-electric engine system of FIG. 1, in accordance with an embodiment.

FIG. 9 shows an example graph of power output over time during the disarming sequence of a fuel cell 26 in accordance with an embodiment. For example, when the relay 410 (FIG. 4) is switched so that the fuel cell 26 is not supplying energy to the integrated hydrogen-electric engine.

Controller Area Network Bus Wireless Relay for Real-Time and Post-Flight Diagnostics Telemetry systems provide automatic transmission of data from point to point for the purpose of monitoring. Telemetry systems have various implementations, in particular, in the vehicle and aircraft industries, which provide information about the vehicle or aircraft performance from components within the vehicle or aircraft. In most instances, the components within vehicles or aircraft communicate through a Controller Area Network (CAN) bus which allows the components within the vehicles or aircraft to communicate with one another.

Figure 10:
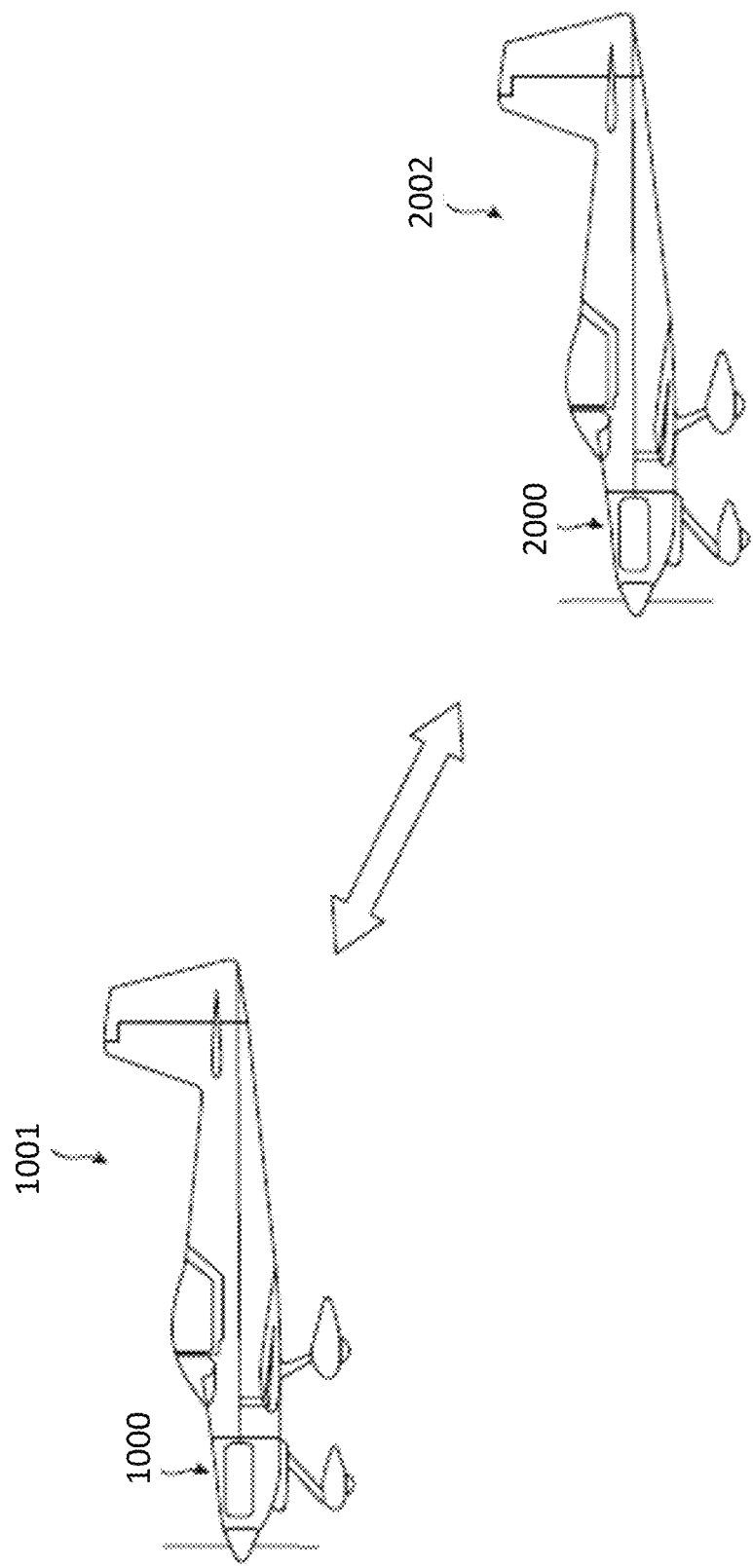
FIG. 10 is a diagram of aircraft having an aircraft relay system, in accordance with an embodiment.

Referring to FIG. 10, a primary aircraft 1001 (e.g., a first hydrogen fuel cell-powered aircraft) and a secondary aircraft 2002 (e.g., a second hydrogen fuel cell-powered aircraft) are shown in accordance with an embodiment. Although described hereinbelow as a turboprop aircraft in accordance with one embodiment, in other embodiments the technology is well suited to other aircraft configurations. In one embodiment, aircraft 1001 and aircraft 2002 generally include a fuselage, a propulsor (e.g., a propeller), a tail including a vertical stabilizer and a pair of horizontal stabilizers, a pair of wings, an exhaust system, a pair of wheel assemblies, and an engine system, such as, for example, hydrogen fuel cell-powered electric engine systems 1000 and 2000, respectively.

Figure 11:
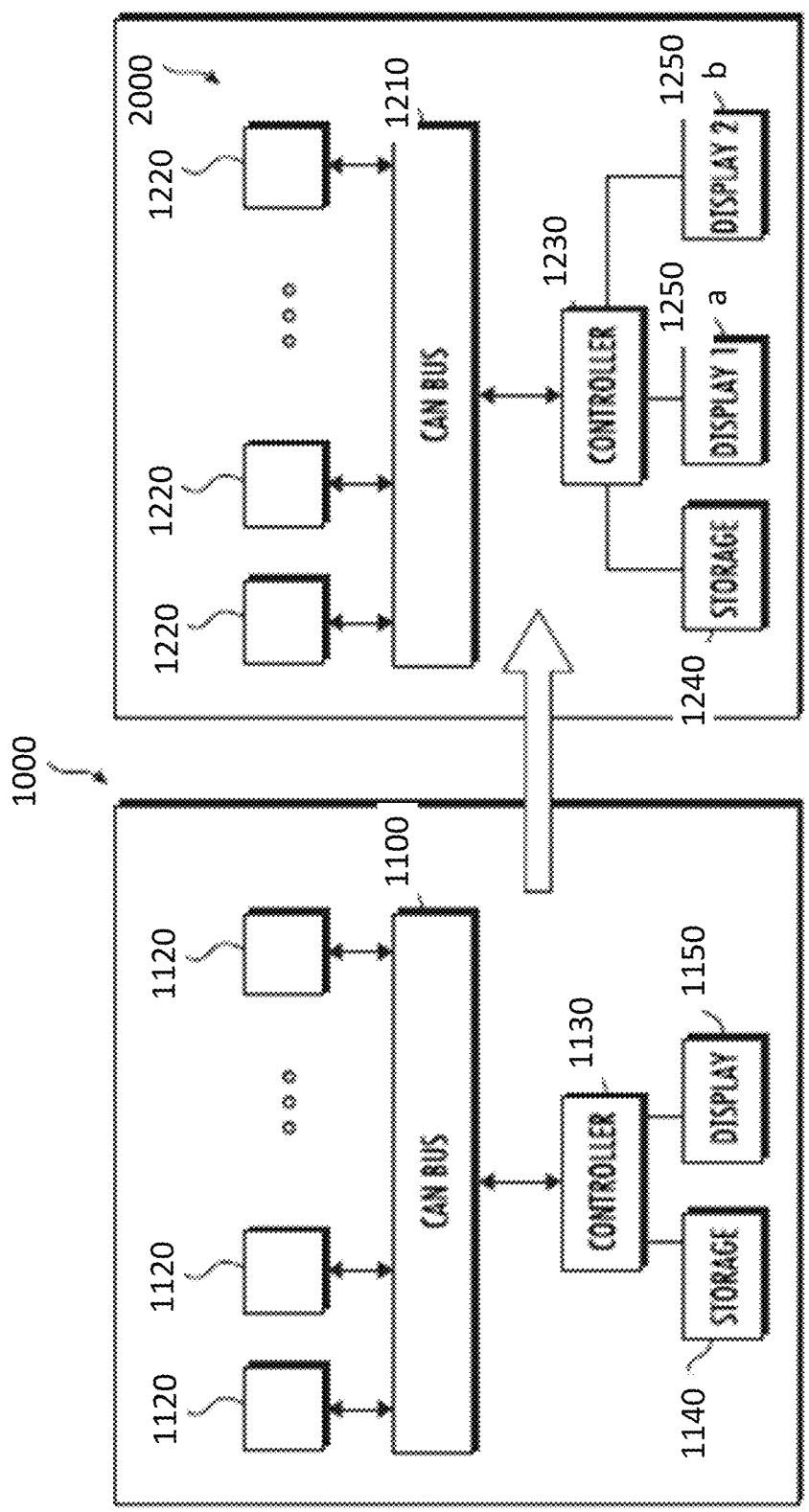
FIG. 11 is a block diagram of the aircraft relay system of the aircraft of FIG. 10, in accordance with an embodiment.

With additional reference to FIG. 11, hydrogen fuel cell-powered electric engine system 1000 of primary hydrogen fuel cell-powered aircraft 1001 is shown in accordance with an embodiment. In one embodiment, hydrogen fuel cell-powered electric engine system 1000 includes a controller area network (CAN) bus 1100, a series of components 1120, a storage 1140, and a display 1150, in communication with a controller 1130 for transmitting data regarding the primary aircraft 1001 to another aircraft. In one embodiment, components 1120 are configured to facilitate operation of the aircraft 1001 and include the powertrain, propulsor, air compressor systems, pump, fuel sources, heat exchangers, compressor systems, hydrogen fuel cell stacks, motor assembly, or any suitable components necessary to effectuate operation of the aircraft 1001.

In one embodiment, components 1120 are configured to communicate with one another via the CAN bus 1100 which is communicatively coupled to the series of components 1120. In one embodiment, the CAN bus 1100 generates CAN data based on information sensed by each of the series of components 1120. In some instances, optical fiber, gigabit ethernet, or any suitable connection are implemented to facilitate communication between the series of components 1120. The display 1150 is used to display monitoring information regarding aircraft 1001 based on the CAN data to a user of the aircraft 1001. The storage is used to store the CAN data from the CAN bus 1100. In one embodiment, the controller 1130 is receives the CAN data from CAN bus 1100 and transmit the CAN data from CAN bus 1100 to the other aircraft 2002.

In one embodiment, the hydrogen fuel cell-powered electric engine system 2000 of secondary hydrogen fuel cell-powered aircraft 2002 includes a CAN bus 1210, a series of components 1220, a storage 1240, a primary display 1250*a*, and a secondary display 1250*b*, in communication with a controller 1230 for receiving data regarding the primary aircraft 1001.

In one embodiment, the series of components 1220 includes components substantially similar to the series of components 1120, such as the powertrain, propulsor, air compressor systems, pump, fuel sources, heat exchangers, compressor systems, hydrogen fuel cell stacks, motor assembly, or any suitable components necessary to effectuate operation of the aircraft 2002.

Similarly, the series of components 1220 communicate with one another via the CAN bus 1210 communicatively coupled to the series of components 1220. The CAN bus 1210 generates CAN data based on information sensed by each of the series of components 1220. In some instances, optical fiber, gigabit ethernet, or any suitable connection is implemented to facilitate communication between the series of components 1220.

In one embodiment, the controller 1230 is utilized to provide a secondary display of real-time and post-flight diagnostic information regarding the first aircraft 1001 in order to monitor the first aircraft away from the first aircraft, e.g., in the second aircraft 2002, thereby uncluttering the pilot's view in the first aircraft. Additionally, and/or alternatively, the diagnostic information received from the first aircraft 1001 is used to provide predictive information which is viewable away from the first aircraft 1001, e.g., in the second aircraft 2002.

In one embodiment, in order to provide real-time and post-flight diagnostic information regarding the first aircraft 1001, the controller 1230 receives the CAN data from CAN bus 1100 and transmits the CAN data from CAN bus 1100 into the CAN bus 1210. In one embodiment, the controller 1230, based on the CAN data from CAN bus 1100, also processes the CAN data from CAN bus 1100 and CAN data originating from CAN bus 1210 to generate monitoring information for aircraft 1001 and aircraft 2002.

In one embodiment, the controller 1230 distinguishes between the monitoring information for aircraft 1001 and aircraft 2002, and displays monitoring information for aircraft 1001 on display 1250*b* and displays monitoring information for aircraft 2002 on display 1250*a*, or vice versa. In one embodiment, the monitoring information for aircraft 1001 and aircraft 2002 is displayed on an individual display 1250*a* or display 1250*b*. In one embodiment, the controller 1230 stores the monitoring information for aircraft 1001 in storage 1240. In one embodiment, the monitoring information for aircraft 2002 is stored in storage 1240.

For example, during flight of aircraft 1001, aircraft 1001 will need either support or another aircraft, namely aircraft 2002 to chase after aircraft 1001. Aircraft 2002 can follow in close vicinity of aircraft 1001 to observe operation of aircraft 1001, in particular, real-time and post flight diagnostics.

Figure 12:
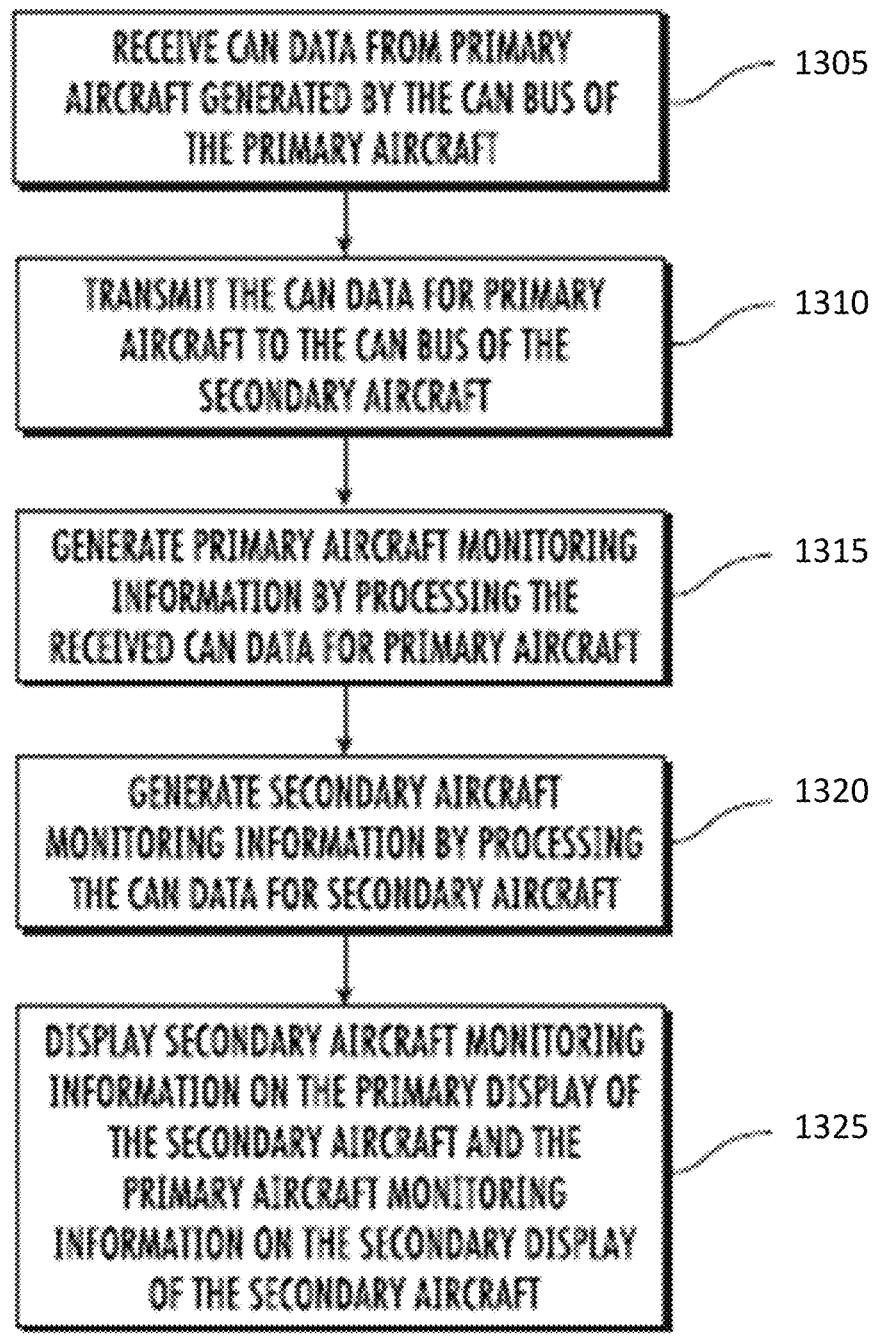
FIG. 12 is a flow diagram of an exemplary operation of the aircraft relay system of the aircraft of FIG. 10, in accordance with an embodiment.

With reference to FIG. 12 a flow diagram of an exemplary operation of the aircraft relay system of the aircraft of FIG. 10 is shown in accordance with an embodiment. With respect to FIG. 12, in operation, during flight of aircraft 1001, the engine system 1000 of aircraft 1001 generates CAN data via the CAN bus 1100. At 1305, the controller 1230 of the aircraft 2002, acting as a chase vehicle, receives the CAN data generated by CAN bus 1100.

Once received, at 1310, the controller 1230 transmits the received CAN data from aircraft 1001 into the CAN bus 1210 of the aircraft 2002. The CAN bus 1210 processes the received and transmitted CAN data from aircraft 1001 and generates, at 1315, monitoring information for aircraft 1001 via CAN bus 1210. At 1320, monitoring information for aircraft 2002 is generated based on the sensed information from the series of components 1220 located within aircraft 2002.

Once the monitoring information is generated for both aircraft 1001 and aircraft 2002 via CAN bus 1210, the controller 1230, at 1325, displays the monitoring information for aircraft 2002 on the primary display 1150*a* and the monitoring information for aircraft 1001 on secondary display 1150*b*, thereby allowing the chase aircraft 2002 to view real-time diagnostics of aircraft 1001 during flight. In one embodiment, certain monitoring information for aircraft 1001 is removed from view of the aircraft 1001 to allow for uncluttered monitoring information that is not immediately important to a pilot of aircraft 1001.

It should be understood the disclosed structure can include any suitable mechanical, electrical, and/or chemical components for operating the disclosed system or components thereof. For instance, such electrical components can include, for example, any suitable electrical and/or electromechanical and/or electrochemical circuitry, which includes or be coupled to one or more printed circuit boards. As appreciated, the disclosed computing devices and/or server can include, for example, a "controller," "processor," "digital processing device" and like terms, and which are used to indicate a microprocessor or central processing unit (CPU).

In one embodiment, the CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" is used to indicate a device that controls the transfer of data from a computer or computing device to a peripheral or separate device and vice versa, and/or a mechanical and/or electro-mechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloud-computing-based storage. In one embodiment, the storage and/or memory device is a combination of devices such as those disclosed herein.

In one embodiment, the memory can be random access memory, read-only memory, magnetic disk memory, solid state memory, optical disc memory, and/or another type of memory. In one embodiment, the memory can be separate from the controller and can communicate with the processor through communication buses of a circuit board and/or through communication cables such as serial ATA cables or other types of cables. The memory includes computer-readable instructions that are executable by the processor to operate the controller. In one embodiment, the controller includes a wireless network interface to communicate with other computers or a server. In one embodiment, a storage device is used for storing data. In one embodiment, the processor is, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, in one embodiment, a controller is remote from the disclosed structure (e.g., on a remote server), and accessible by the disclosed structure via a wired or wireless connection. In one embodiment where the controller is remote, it is accessible by, and coupled with, multiple structures and/or components of the disclosed system.

The term "application" includes a computer program designed to perform particular functions, tasks, or activities for the benefit of a user. Application can refer to, for example, software running locally or remotely, as a stand-alone program or in a web browser, or other software which would be understood by one skilled in the art to be an application. An application runs on the disclosed controllers or on a user device, including for example, on a mobile device, an IoT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light-emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller includes or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled to a mesh network. As used herein, a "mesh network" is a network topology in which each node relays data for the network. In general, mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all coupled with each other is a fully connected network.

In one embodiment, the controller includes one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines or sections of programs that perform a particular task.

As used herein, the controller includes software modules for managing various functions of the disclosed system or components thereof.

In one embodiment, the disclosed structure also utilizes one or more controllers to receive various information and transform the received information to generate an output. The controller includes any type of computing device, computational circuit, or any type of processor or processing circuit capable of executing a series of instructions that are stored in memory. The controller includes multiple processors and/or multicore central processing units (CPUs) and includes any type of processor, such as a microprocessor, digital signal processor, microcontroller, programmable logic device (PLD), field programmable gate array (FPGA), or the like. The controller also includes a memory to store data and/or instructions that, when executed by the one or more processors, cause the one or more processors to perform one or more methods and/or algorithms.

Any of the herein described methods, programs, algorithms, or codes are converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program can encompass the actual instructions and/or the intent of those instructions.

The present technology is described in the general context of computer-executable instructions, such as program modules, being executed by a computer. Generally, program modules include routines, programs, objects, components, data structures, etc., that perform particular tasks or implement particular abstract data types. In one embodiment, the present technology is practiced in distributed computing environments where tasks are performed by remote processing devices that are linked through a communications network. In a distributed computing environment, program modules are located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A multiple energy source management system for an integrated hydrogen-electric engine, said multiple energy source management system comprising:
    a first energy source configured to supply energy to said integrated hydrogen-electric engine;
    a second energy source configured to supply energy to said integrated hydrogen-electric engine;
    a pre-charge load configured to provide a second energy demand lower than a first energy demand of said integrated hydrogen-electric engine to a selected energy source;
    a sensor configured to sense a power output from at least one of said first energy source and said second energy source;
    a relay system configured to selectively switch between said first energy source, and said second energy source, said relay system comprising:
        a first state where said first energy source is selected to supply energy to said integrated hydrogen-electric engine;
        a second state where said second energy source is selected to supply energy to said integrated hydrogen-electric engine; and
        a third state where said second energy source is supplying energy to said pre-charge load;
    a processor; and
    a memory, comprising instructions stored thereon, which, when executed, cause said multiple energy source management system to:
        sense, by said sensor, an output energy of said first energy source;
        determine if said output energy is below a threshold value;
        switch said relay system from said first state to said third state for a predetermined period of time, based on said determination;
        pre-charge said second energy source by said pre-charge load; and
        switch said relay system to said second state after said predetermined period of time.

2. The multiple energy source management system of claim 1, wherein said first energy source comprises a battery, a fuel cell, or combinations thereof.

3. The multiple energy source management system of claim 2, wherein said fuel cell comprises a hydrogen-electric fuel cell.

4. The multiple energy source management system of claim 1, wherein said second energy source comprises a battery, a fuel cell, or combinations thereof.

5. The multiple energy source management system of claim 1, wherein said pre-charge load is a lower value than a value of a load of said integrated hydrogen-electric engine.

6. The multiple energy source management system of claim 1, further comprises:
    a motor; and
    an inverter configured to convert direct current from at least one of said first energy source or said second energy source to alternating current for actuating said motor in electrical communication with said inverter, wherein said inverter is electrically coupled to said relay system to receive direct current from at least one of said first energy source or said second energy source.

7. The multiple energy source management system of claim 1, wherein said relay system comprises a fourth state where said first energy source is supplying energy to said pre-charge load.

8. The multiple energy source management system of claim 7, wherein said first energy source comprises a smoothing capacitor.

9. The multiple energy source management system of claim 8, wherein said second energy source comprises a smoothing capacitor.

10. The multiple energy source management system of claim 1, further comprising a display, wherein said instructions, when executed by said processor, further cause said multiple energy source management system to:

display on said display a status of said relay system.

11. A computer-implemented method for multiple energy source management for an integrated hydrogen-electric engine, said computer-implemented method comprising:

sensing, by a sensor, an output energy of a first energy source;

determining if said output energy is below a threshold value;

switching a relay system from a first state to a third state where a second energy source is supplying energy to a pre-charge load, for a predetermined period of time, based on said determination, wherein said first state comprises where said first energy source is selected to supply energy to said integrated hydrogen-electric engine;

pre-charging said second energy source by said pre-charge load; and switching said relay system to a second state where said second energy source is selected to supply energy to said integrated hydrogen-electric engine, after said predetermined period of time.

12. The computer-implemented method of claim 11, wherein said first energy source comprises a battery, a fuel cell, or combinations thereof.

13. The computer-implemented method of claim 12, wherein said fuel cell comprises a hydrogen-electric fuel cell.

14. The computer-implemented method of claim 13, wherein said second energy source comprises a battery, a fuel cell, or combinations thereof.

15. The computer-implemented method of claim 11, wherein said pre-charge load is a lower value than a value of a load of said integrated hydrogen-electric engine.

16. The computer-implemented method of claim 11, further comprising:

receiving a direct current from at least one of said first energy source or second energy source; and converting, by an inverter, said direct current to an alternating current for actuating a motor in electrical communication with said inverter.

* * * * *